United States Patent [19]
Miyata et al.

[11] Patent Number: 5,696,920
[45] Date of Patent: Dec. 9, 1997

[54] STAND-ALONE DATA DRIVEN TYPE INFORMATION PROCESSOR

[75] Inventors: Souichi Miyata, Nara; Shinichi Yoshida, Kashihara; Tsuyoshi Muramatsu, Tenri, all of Japan

[73] Assignee: Sharp Kabushiki Kaisha, Osaka-fu, Japan

[21] Appl. No.: 789,691

[22] Filed: Jan. 27, 1997

Related U.S. Application Data

[63] Continuation of Ser. No. 400,511, Mar. 7, 1995, abandoned, which is a continuation of Ser. No. 116,967, Sep. 7, 1993, abandoned.

[30] Foreign Application Priority Data

| Sep. 7, 1992 | [JP] | Japan | 4-238425 |
| Sep. 7, 1992 | [JP] | Japan | 4-238426 |

[51] Int. Cl.[6] .................................................. G06F 15/82
[52] U.S. Cl. ........................ 395/377; 395/800; 395/849; 395/850
[58] Field of Search ........................... 395/377, 849, 395/850, 800

[56] References Cited

U.S. PATENT DOCUMENTS

| 4,156,908 | 5/1979 | Missios et al. | 364/200 |
| 4,156,910 | 5/1979 | Barton et al. | 395/600 |
| 4,327,407 | 4/1982 | Burrows | 395/775 |
| 4,953,083 | 8/1990 | Takata et al. | 395/250 |
| 5,392,442 | 2/1995 | Komori et al. | 395/800 |
| 5,404,539 | 4/1995 | Onozaki | 395/725 |
| 5,404,558 | 4/1995 | Okamoto | 395/800 |

FOREIGN PATENT DOCUMENTS 5181984  7/1993  Japan .

*Primary Examiner*—Robert B. Harrell
*Assistant Examiner*—Saleh Najjar

[57] ABSTRACT

A data driven type information processor includes a data driven type information processing unit, and a download unit. The information processing unit includes a program storing unit and an input/output control unit of a data packet for storing information stored in a data packet including a load instruction into the program storing unit and for carrying out a data driven type process on data packets including other instructions according to information stored in the program storing unit. The download unit downloads program data to the information processing unit by applying a data packet including the load instruction and program data to be stored in the program storing unit. The download unit includes a memory for storing program data, a readout circuit for reading out a set of program data stored in the memory, and a packet generation circuit for generating a data packet including the load instruction and readout program data to provide the same to the input/output control unit of the information processing unit. The memory may store a plurality of sets of program data.

9 Claims, 9 Drawing Sheets

STAND-ALONE DATA DRIVEN TYPE INFORMATION PROCESSOR

This application is a continuation of application Ser. No. 08/400,511 filed on Mar. 7, 1995, now abandoned, which is a continuation of application Ser. No. 08/116,967 filed on Sep. 7, 1993, now abandoned.

BACKGROUND OF THE INVENTION

1. Field of the Invention

The present invention relates to data driven type information processors, and more particularly to a data driven type information processor having downloading functionality of programs and data to an internal memory.

2. Description of the Background Art

Referring to FIG. 1, a conventional data driven type information processor 30 includes input/output control units 60, 62 and 70, a program storing unit 64, a firing control unit 66, and an operation unit 68. An extended data storing unit 32 and an extended program storing unit 34 are connected as externally provided memories to data driven type information processor 30.

Input/output control units 60, 62 and 70 receive a data packet 100 (refer to FIG. 2). The input/output control units have branching and distributing functionality to allocate the destination of a data packet depending on destination information stored therein.

Program storing unit 64 is a temporary storing unit of a program incorporated in data driven type information processor 30, and includes a cache memory. Program data that is to be accessed frequently or at high speed is selectively stored in the cache memory in program storing unit 64 when the size of the program to be stored in data driven type information processor 30 is particularly great. Other programs are stored in extended program storing unit 34.

Firing control unit 66 includes a matching memory region 72 in which one of a pair of data packets 100 to be operated waits until the other data packet 100 is provided. When one pair of data packet 100 matches, firing control unit 66 combines this pair of data packet 100 as one data packet 102 (refer to FIG. 3) which is fed (referred to as "firing") to operation unit 68. When the number of waiting data packets exceeds the capacity of the matching memory, firing control unit 66 functions to set an input data packet 100 to not-processed status and sends the same into extended data storing unit 32.

Operation unit 68 serves to carry out calculation and logic operation on data in data packet 102 according to instruction information in the data packet.

Regarding the data packets flowing within data driven type information processor 30, all the data packets 100 other than those provided to operation unit 68 from firing control unit 66 include a destination field 110, an instruction field 116, a data field 118, and a generation field 120, as shown in FIG. 2.

Destination field 110 stores destination information. Instruction field 116 stores instruction information. Data field 118 stores operand data (including constant data). Generation field 120 stores a generation number GN.

Destination information stored in destination field 110 includes a node number (ND) 112 and a processor number (PE) 114. A node number (ND) 112 corresponds to an identification number of each instruction in a data flow program executed by data driven type information processor 30. A processor number (PE) 114 identifies destination processor for a relevant data packet 100 when a data packet 100 is provided to a multiprocessor system including a plurality of data driven type information processors.

A generation number GN in generation field 120 identifies a data set including the relevant data packet 100.

Referring to FIG. 3, a data packet 102 provided from firing control unit 66 to operation unit 68 includes fields 130, 136 and 142 corresponding to the above-described fields 110, 116, and 120, respectively. Data packet 102 further includes data fields 138 and 140. Each of fields 138 and 140 corresponds to the above-described data field 118. Field 138 stores left-hand operand data (including constant data), and field 140 stores right-hand operand data (including constant data). Each of left-hand and right-hand operand data indicates, for example, two operand data in a binary operation.

The information stored in fields 130, 136, and 140 in data packet 102 are identical to the information stored in fields 110, 116, and 120 in data packet 100. Therefore, detailed description thereof will not be repeated here.

The data driven type information processor 30 shown in FIG. 1 operates as follows. It is assumed that the data flow program to be executed and various parameter data required for execution are stored in advance in the memories or registers in program storing unit 64 and input/output control units 60, 62 and 70.

A data packet is applied to data driven type information processor 30 via terminals IN (40 and 42). This data packet is applied to program storing unit 64 via input/output control units 60 and 62. If the system includes a plurality of data driven type information processors, a data packet 100 may have a destination to another information processor instead of this data driven type information processor. Such a data packet 100 bypasses this data driven type information processor by input/output control unit 60 to be provided to an output terminal OUT (44 and 46). The data applied to data driven type information processor 30 includes the format of a data packet 100 having the value of a determinate destination information.

Data packet 100 is supplied to program storing unit 64 from input/output control unit 62. As described above, a data flow program as shown in FIG. 4 is already stored in program storing unit 64. Program storing unit 64 reads out the next destination information and next instruction information as shown in FIG. 4 from an address specified according to the destination information in the data packet 100 of FIG. 2. Program storing unit 64 stores the read out destination information and instruction information into the destination field and instruction field of the input data packet 100, respectively. That data packet 100 is provided to firing control unit 66.

Firing control unit 66 includes a matching memory 72 shown in FIG. 5. Matching memory 72 is addressed according to the destination information in input data packet 100 of FIG. 2, and provides matching operand data (including a constant) as shown in FIG. 5. Firing control unit 66 carries out matching (detection of data pair) of data packet 100 provided from program storing unit 64 using matching memory 72.

More specifically, firing control unit 66 operates as set forth in the following when the instruction information stored in data packet 100 is a binary operation instruction manipulating two operand data. Firing control unit 66 addresses matching memory 72 according to the destination information (ND and PE) and the generation number GN stored in data packet 100. If operand data is stored in matching memory 72, firing control unit 66 fires. More specifically, the operand data of one data packet is paired with the operand data of the other data packet out of the two data packets having matching destination information (MD and PE) and generation number GN to produce a new data packet 102. For example, firing control unit 66 pairs the contents of data field 118 of one data packet with the contents of data field 118 of the other data packet to produce a new data packet 102. Firing control unit 66 applies this new data packet 102 to operation unit 68.

If matching operand data is not stored in the relevant specified address, firing control unit 66 writes the operand data and the matching generation number of a relevant input data packet into an address specified according to destination information (ND and PE) and a generation number GN stored in data packet 100. This data packet waits until a pairing data packet is provided. In this case, firing control unit 66 does not provide a data packet 102.

Operation unit 68 applies operation on the operand data in data packet 102 provided from firing control unit 66 according to the instruction information stored in data packet 102. Operation unit 68 stores the operation result into data field 118 of data packet 100. This data packet 100 is provided to input/output control unit 70.

Data packet 100 provided from operation unit 68 arrives at program storing unit 64 via input/output control units 70, 60 and 62. Program storing unit 64 responds to an applied data packet to read out the next instruction. Independent of such an operation, data packet 102 provided from firing control unit 66 is also applied to extended program storing unit 34. In response, extended program storing unit 34 provides the next instruction to program storing unit 64. More specifically, a subsequent instruction is pre-fetched to be stored in program storing unit 64 independent of completion of one instruction.

During the circulation of a data packet in the flow path formed by program storing unit 64, firing control unit 66, and operation unit 68, data driven type information processor 30 carries out an operation process according to the stored data flow program.

In a von Neumann type information processor, mainly the "instruction information" is only required as program data. However, because the above-described data driven type information processor 30 processes data in packets, "destination information" and "operand data (including constant)" are required in addition to "instruction information" as program data. Object data of a data flow program generated by data driven type information processor 30 is inevitably redundant in comparison with that generated by a conventional von Neumann type information processor. Therefore, development of a data flow program for a data driven type information processor, logic verification of a developed data flow program, and conversion of a data flow program into object data are carried out using a dedicated computer having relevant processing functionality, such as a workstation.

The object data of a data flow program obtained by such dedicated computers is downloaded into an information processor 30 through a transmission line directly from such dedicated computers, or via a dedicated host computer or personal computer. Such a system is schematically shown in FIG. 6.

FIG. 6 shows an example of a system configuration for downloading program and data into data driving type information processor 30 shown in FIG. 1, or for uploading data from data driven type information processor 30 of FIG. 1 to a host computer.

Suppose that object data of a data flow program is to be downloaded to data driven type information processor 30. Referring to FIG. 6, a von Neumann type processor 150 is connected to information processor 30 via a bus interface (I/F) 152. A von Neumann type processor 150 includes a main CPU (Central Processing Unit) 156, a memory 158 accessed by CPU 156, and a CPU bus 154.

In the system of FIG. 6, object data generated under the control of CPU 156 is stored in memory 158. The stored object data is downloaded to data driven type information processor 30 via CPU bus 154 and bus I/F 152. If the data formats differ from each other between von Neumann type processor 150 and data driven type information processor 30, bus I/F 152 carries out conversion of the data format.

Von Neumann type processor 150 also functions to upload processed resultant data from data driving type information processor 30 to gather and analyze the resultant data, which is provided again to data driven type information processor 30, if necessary.

Download refers to a transfer of a code image (pattern image of microcodes of "1" and "0") from one processor (von Neumann type processor 150) to another processor (data driven type information processor 30).

A conventional data driven type information processor 30 cannot be incorporated into another piece of equipment in a stand-alone (single) manner. More specifically, in order to download data into data driven type information processor 30 and enable continuation of program execution as shown in FIG. 6, another host computer (von Neumann type processor 150) and interface thereof (bus I/F 152) must be simultaneously incorporated into the equipment. Alternatively, a host processor having equivalent functionality must be additionally provided to data driven type information processor 30 as a controller of the equipment. Therefore, it is difficult to reduce the size of an equipment incorporating data driven type information processor 30. It is also difficult to reduce the cost.

SUMMARY OF THE INVENTION

An object of the present invention is to provide a data driven type information processor that can operate in a stand-alone manner.

Another object of the present invention is to provide a data driven type information processor that can operate in a stand-alone manner, and that allows reduction of the equipment in which it is incorporated.

A further object of the present invention is to provide a data driven type information processor that can operate in a stand-alone manner, and reduce the size and cost of the equipment in which it is incorporated.

Still another object of the present invention is to provide a data driven type information processor that can operate in a stand-alone manner, and that allows downloading of program data even during execution of data processing.

A still further object of the present invention is to provide a data driven type information processor that can operate in a stand-alone manner, and that allows downloading of desired program data even during execution of data processing.

Yet a further object of the present invention is to provide a data driven type information processor that can operate in a stand-alone manner, and that can carry out downloading of desired program data with easy operation even during execution of data processing.

A data driven type information processor according to the present invention includes a data driven type information processing unit, and a download unit. The information processing unit includes a program storing unit, and an input/output control unit of a data packet. Information stored in a data packet including loading instructions is stored in the program storing unit. A data driven type process is carried out on a data packet including other instructions according to information stored in the program storing unit. The download unit downloads program data for the information processing unit by providing, to the information processing unit, a data packet including a load instruction and program data to be stored in the program storing unit. The download unit includes a memory for storing program data, a read out circuit for reading out a set of program data stored in the memory, and a packet generation circuit for generating and providing, to the input/output control unit of the information processing unit, a data packet including a load instruction and read out program data. The memory may include a plurality of sets of program data.

Because program data can be downloaded into the information processing unit without using a workstation or the like, the data driven type information processor can be used in a stand-alone manner. Because a workstation or the like does not have to be incorporated, the equipment including the data driven type information processor can be easily reduced in size. Furthermore, the cost of the equipment including the data driven type information processor can be reduced because it is not necessary to incorporate an expensive device such as a workstation with the data driven type information processor of the present application. Because program data can be provided to the information processing unit in a format of a data packet similar to a normal one, downloading of a desired program data into the information processing unit can be carried out even during operation of the information processing unit.

According to an aspect of the present invention, the read out circuit includes a circuit for selectively reading out an arbitrary selected set of program data out of a plurality of sets of program data stored in the memory.

The selective read out circuit includes a circuit for receiving an externally applied signal specifying a set of program and for calculating a specific reference address, for example, a head address of that program data in an address space occupying the memory. The selective read out circuit also includes an address generation circuit for incrementing an address by a predetermined number of times for sequentially generating an address signal for specifying each address in the address space. Alternatively, the address generation circuit may externally receive a value indicating the number of packets to be output and increment the address by a number of times corresponding to the number of packets.

Downloading of program data to an information processing unit can be realized with the above-described simple structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Two embodiments of the present invention will be described in detail hereinafter with reference to the drawings.

First Embodiment

Figure 7:
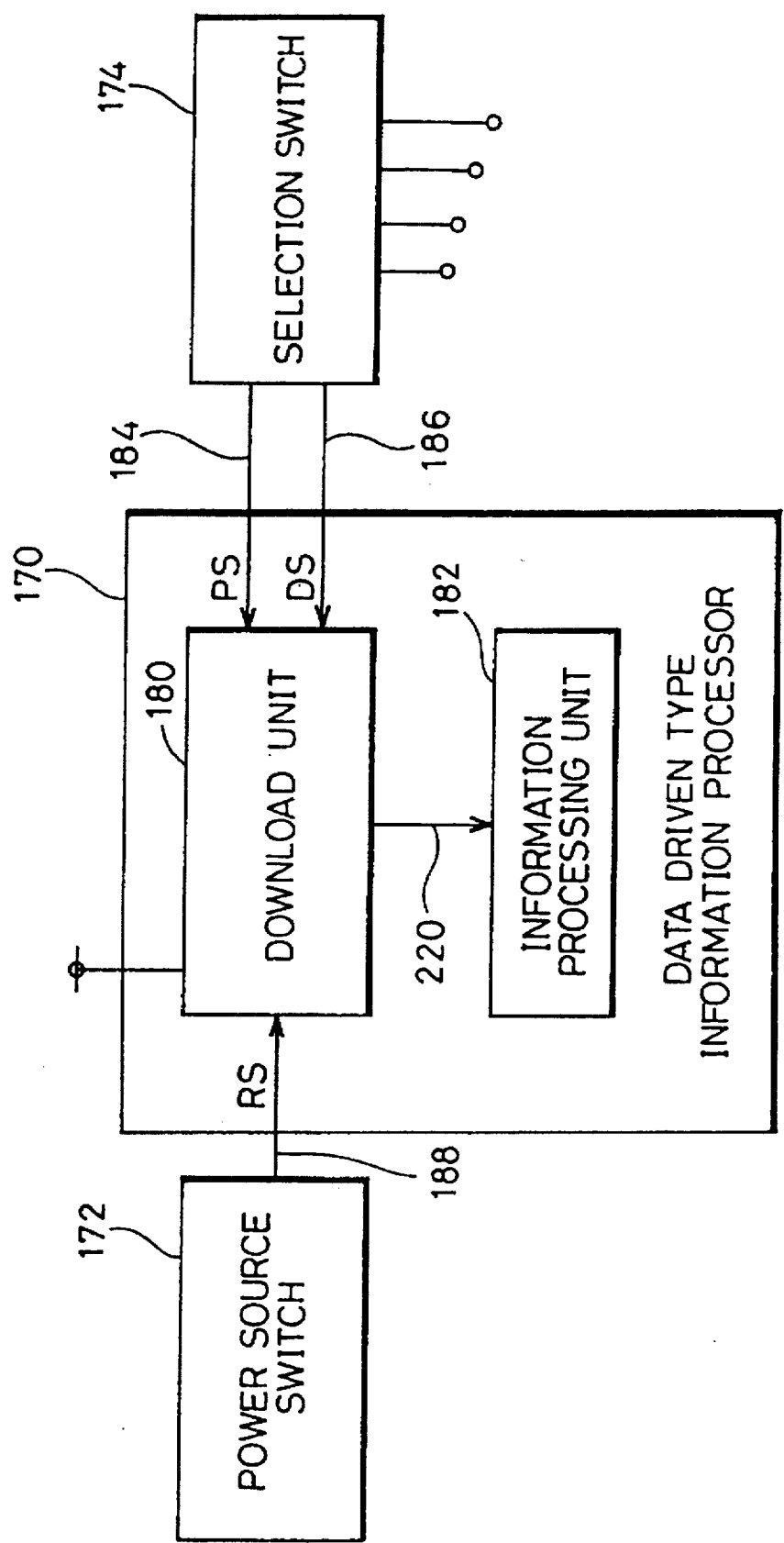
FIG. 7 is a block diagram of a data driven type information processor according to a first embodiment of the present invention.

FIG. 7 is a block diagram of a data driven type information processor 170 incorporating downloading functionality according to a first embodiment of the present invention.

Figure 2:
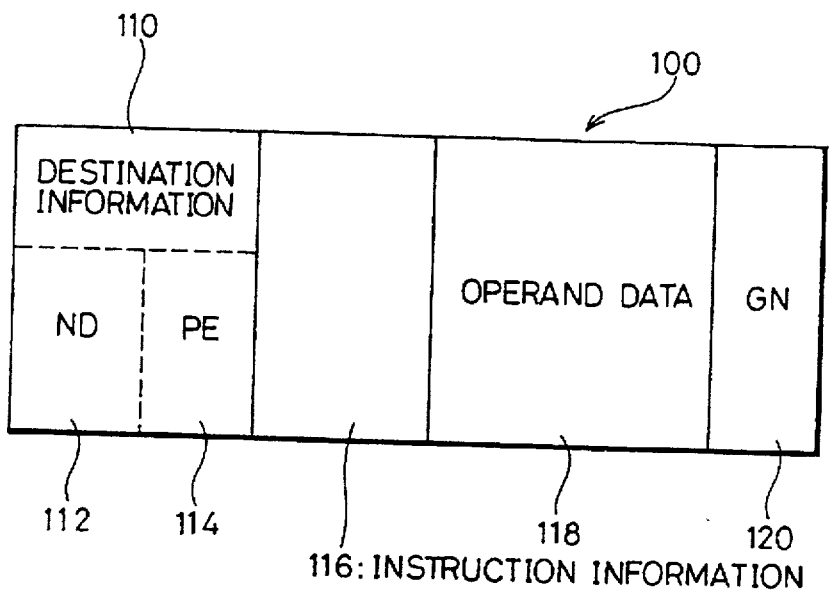
FIG. 2 is a field configuration of a data packet in a data driven type information processor.
Figure 3:
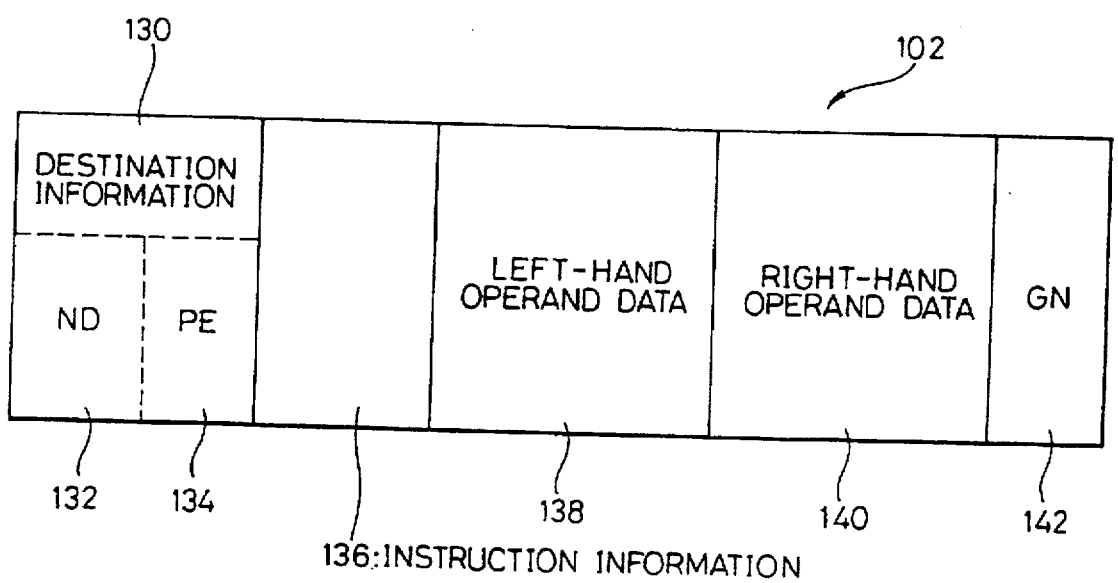
FIG. 3 is a field structure of a data packet in a data driven type information processor.

The field configuration of a data packet circulated within data driven type information processor 170 of the present embodiment is similar to the field configuration of data packets 100 and 102 shown in FIGS. 2 and 3. Therefore, detailed description thereof will not be repeated here. Where it is necessary, the contents of a packet will be described with reference to FIGS. 2 and 3 in the following.

Figure 1:
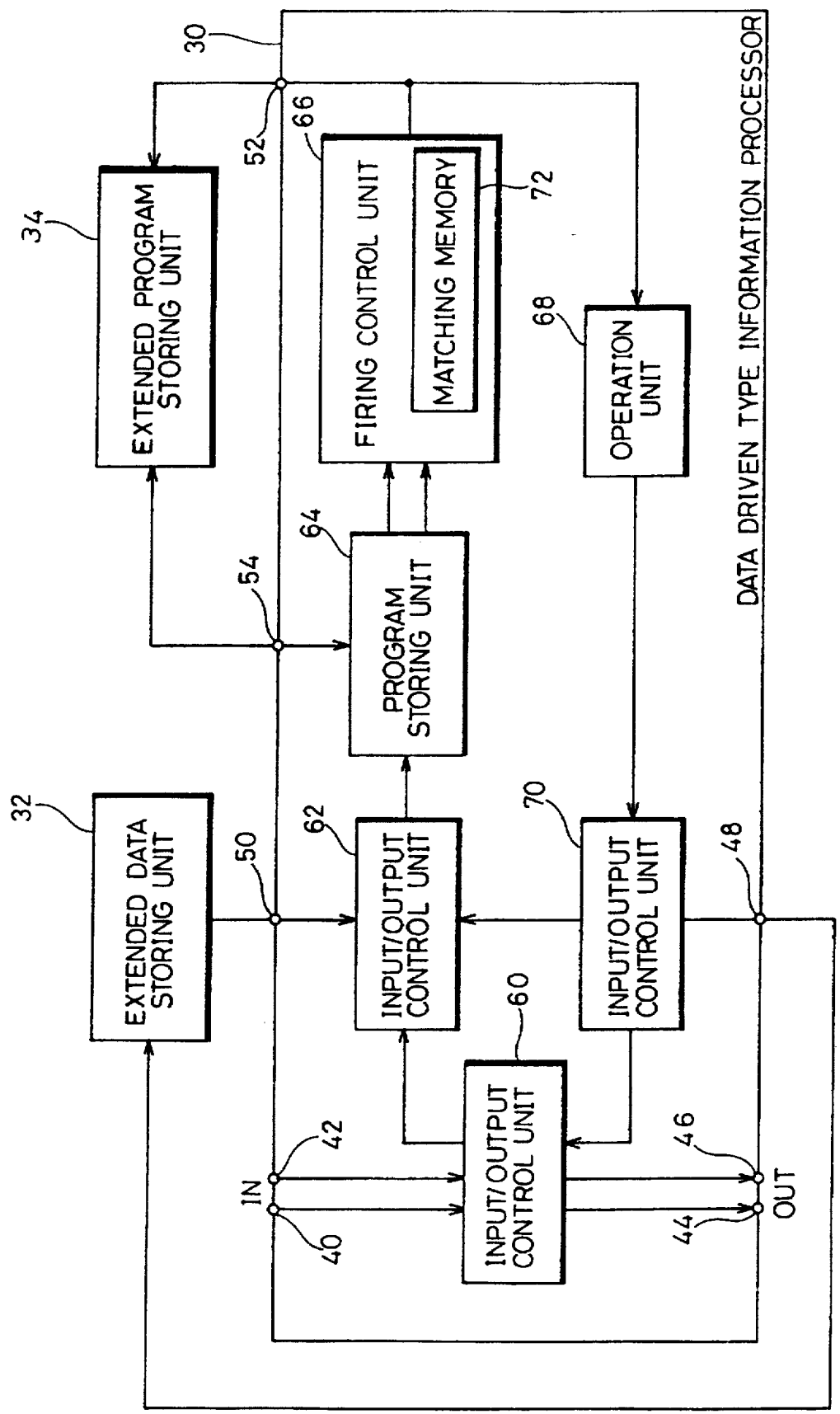
FIG. 1 is a block diagram of a conventional data driven type information processor.

Referring to FIG. 7, data driven type information processor 170 of the present embodiment includes an information processing unit 182 for carrying out data driven type information processing similar to that of the conventional data driven type information processor 30 of FIG. 1, and a download unit 180 for downloading object data into information processing unit 182. A power supply switch 172 and a selection switch 174 are externally connected to data driven type information processor 170.

Data driven type information processor 170 is configured so as to allow loading of another program and constant data in object data format from download unit 180 into information processing unit 182 even when a data flow program is being executed in information processing unit 182. Information processing unit 182 has a configuration and functionality similar to those of the above-described data driven type information processor 30 of FIG. 7. Therefore, detailed description thereof will not be repeated here.

Power supply switch 172 serves to start or stop power supply for driving data driven type information processor 170. When operated, power supply switch 172 initiates power supply to data driven type information processor 170 and provides a reset signal (RS) 188. Power supply switch 172 may be substituted with an externally operated reset button. Upon operating this reset button, a reset signal 188 is provided. Power supply switch 172 and a reset button are provided to instruct reset (initialization) of the hardware of data driven type information processor 170. Power supply switch 172 is operated to provide the above-described hardware reset operation and power supply start indication, whereas the reset button is operated to instruct only reset of the hardware.

Selection switch 174 includes, for example, four terminals. Each terminal is applied with either ground potential or a predetermined potential. It is assumed that ground potential is logic 0, and the predetermined potential is logic 1. Using selection switch 174, a 4-bit signal of "0000" to "1111" can be generated. Of the four bits, the most significant 2 bits are a program select specifying signal (PS) 184, and the least significant 2 bits are a constant data group select specifying signal (DS) 186. Select specifying signals 184 and 186 are applied to data driven type information processors 170.

Figure 8:
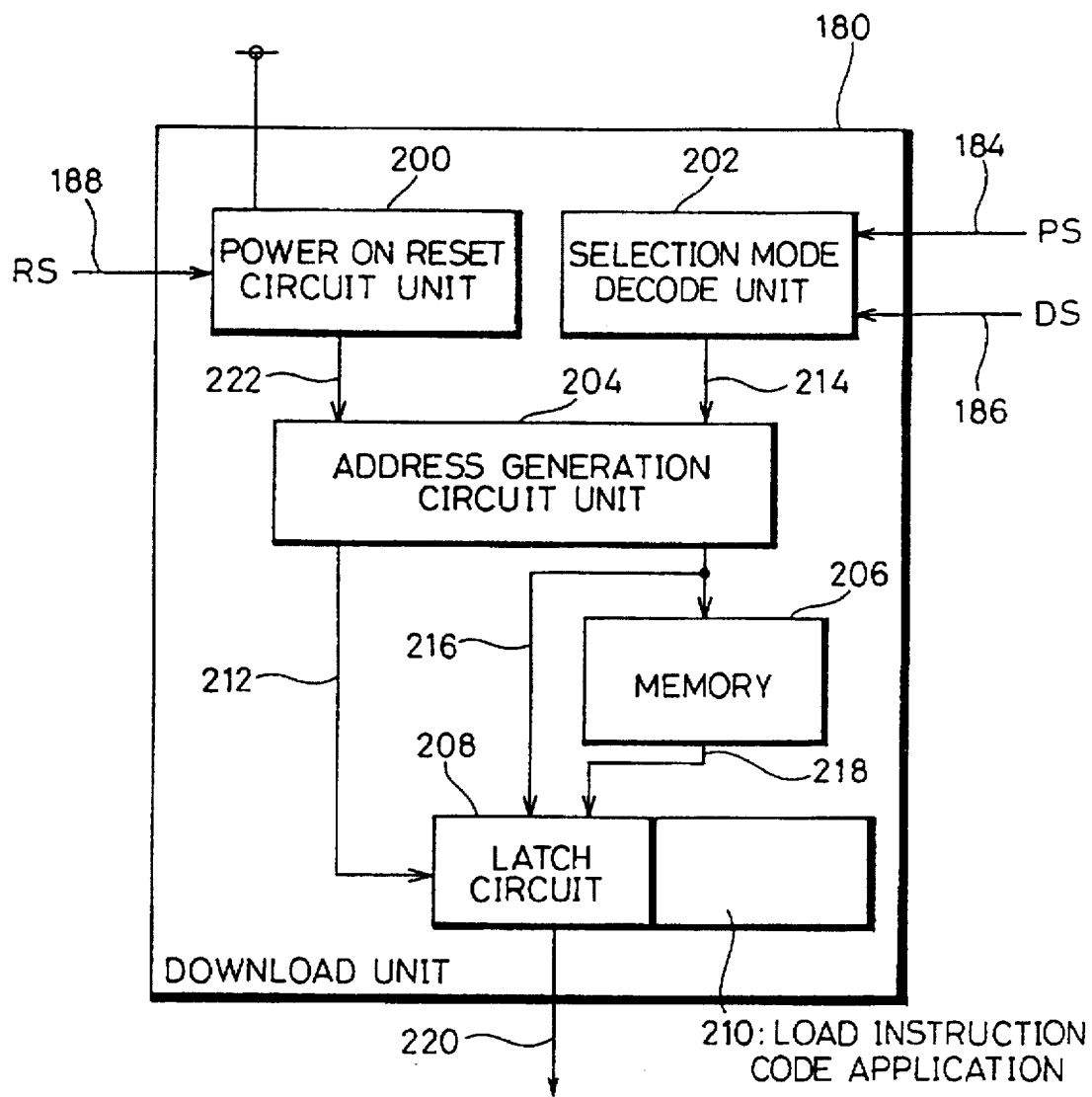
FIG. 8 is a block diagram of a download unit of the data driven type information processor according to the first embodiment of the present invention.

Referring to FIG. 8, download unit 180 includes a power-on reset circuit unit 200 to which power supply switch 172 or a reset button not shown is connected, a selection mode decode unit 202 to which selection switch 174 is connected, an address generation circuit unit 204 having a timing circuit unit 230 and an address counter 232, a memory 206 connected to address generation circuit unit 204, a latch circuit 208, and a load instruction code applying circuit 210.

Power-on reset circuit unit 200 responds to a reset signal 188 to generate and provide to address generation circuit unit 204 a power-on reset signal 222 for enabling address generation circuit unit 204.

Selection mode decode unit 202 decodes an applied program select specifying signal 184 and a constant data group select specifying signal 186 according to a predetermined procedure for generating and providing to address generation circuit unit 204 a preset/reset data (SRD) 214. Preset/reset data 214 includes data specifying the head address on memory 206 of a data flow program specified by select specifying signal 184 out of a plurality of types of data flow programs stored in memory 206, and data specifying the head address on memory 206 of a constant data group specified by select specifying signal 186 out of the plurality of types of constant data groups stored in memory 206.

Memory 206 includes a ROM (Read-Only Memory) pre-programmed with a data flow program generated after logic verification by a computer such as a workstation and object data of constant data, or a ultraviolet-light erasable type programmable ROM. Memory 206 stores a plurality of types of data flow programs and constant data groups. The number of types of data flow programs and the number of types of data groups stored in memory 206 are determined according to the bit width of program select specifying signal 184 and the bit width of a constant data group select specifying signal 186, respectively.

Latch circuit 208 and load instruction code applying circuit 210 latches data (D) 218 read out from memory 206 to generate and provide to information processing unit 182 download data 220. Latch circuit 208 latches an applied address 216 and data 218 to generate data packet 100 of FIG. 2 in synchronization with a clock signal 212. Load instruction code applying circuit 210 applies a load instruction code to instruction field 116 of the generated data packet 100. A load instruction code indicates that the relevant data packet 100 is the data to be stored in a region corresponding to program storing unit 64 of FIG. 1 in information processing unit 182.

Figure 9:
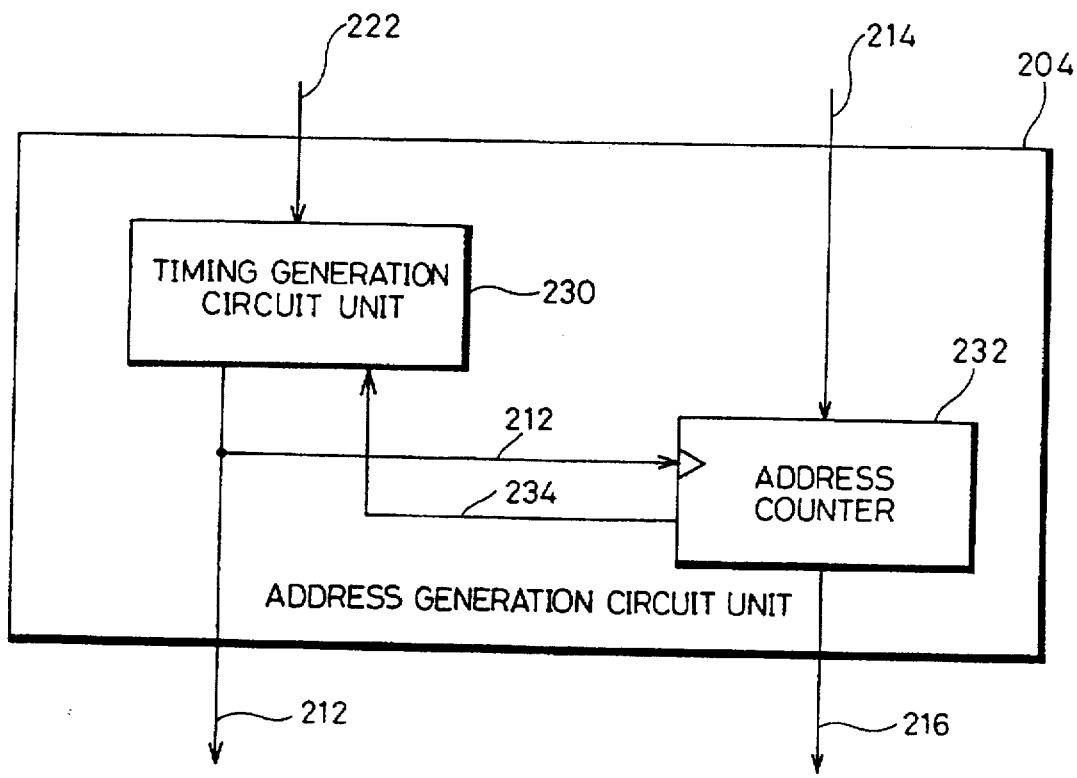
FIG. 9 is a block diagram of an address generation unit of the data driven type information processor according to the first embodiment of the present invention.

Referring to FIG. 9, address generation circuit unit 204 includes a timing generation circuit unit 230 and an address counter 232. Address generation circuit unit 204 is enabled in response to a power-on reset signal 222 to generate a timing signal. Address generation circuit unit 204 also generates sequentially an address 216 of a selected program data or constant data in memory 206 according to this timing signal and preset-reset data 214 provided from selection mode decode unit 202. Address 216 is provided to memory 206 and latch circuit 208.

Timing generation circuit unit 230 includes two inputs connected to the outputs of power-on reset circuit unit 200 and address counter 232. Timing generation circuit unit 230 incorporates a clock generation circuit (not shown) for generating a clock signal 212 of a predetermined cycle. Timing generation circuit unit 230 initiates output of a clock signal 212 when enabled. Clock signal 212 is applied in parallel to address counter 232 and to latch circuit 208. Timing generation circuit unit 230 responds to a stop flag (SPF) 234 applied from address counter 232 stops clock signal 212.

Address counter 232 generates an address 216 sequentially according to clock signal 212 and preset/reset data 214 provided from selection mode decode unit 202. Address 216 is applied parallel to memory 206 and latch circuit 208. Address counter 232 responds to the start of a clock signal 212 input and starts counting the pulses of clock signal 212. When a predetermined maximum count value is counted, a stop flag 234 is provided.

The data driven type information processor according to the first embodiment of the present invention shown in FIGS. 7-9 operates as follows.

It is assumed that selection switch 174 is set so as to output an appropriate program select specifying signal 184 and a constant data group select specifying signal 186.

Power-on reset circuit unit 200 responds to a reset signal 188 provided from power supply switch 172 to generate a power-on reset signal, enabling timing control unit 230.

Selection mode decode unit 202 decodes the applied program select specifying signal 184 and constant data group select specifying signal 186 according to a predetermined procedure and generates preset/reset data 214. Selection mode decode unit 202 provides preset/reset data 214 to address counter 232 of address generation circuit unit 204.

Timing control unit 230 responds to a power-on reset signal 222 and initiates output of a clock signal 212 of a predetermined cycle. Clock signal 212 is provided parallel to address counter 232 and latch circuit 208. Address counter 232 responds to an input of clock signal 212 to initiate counting. Address counter 232 starts counting up the address from the head address included in preset/reset data 214 to provide an address 216 sequentially. Address 216 is applied parallel to memory 206 and latch circuit 208.

Memory 206 reads out and provides as data 218 the object data stored in an applied address 216. Data 218 includes the object data of a program or a constant data group specified by selection switch 174.

Latch circuit 208 and load instruction code applying circuit 210 latches data 218 read out from memory 206 and provides the same as download data 220. More specifically, latch circuit 208 latches applied address 216 and data 218 to generate data packet 100 of FIG. 2 in synchronization with a clock signal 212. Then, load instruction code applying circuit 210 applies a load instruction code to the instruction field 116 (refer to FIG. 2) of that data packet 100. Therefore, download data 220 has a format of data packet 100 shown in FIG. 2, and includes information specifying that data packet 100 is the data to be stored in program storing unit 64 of information processing unit 182.

Information processing unit 182 receives data packet 100 of download data 222 from download unit 180 via an input terminal corresponding to input terminal IN shown in FIG. 1. Data packet 100 is provided to program storing unit 64 via input/output control units 60, 62 and 70. Program storing unit 64 decodes the instruction information of data packet 100. If the instruction information is a load instruction code specifying program storing unit 64, the destination information and instruction information of data packet 100 are stored in program storing unit 64 in a format indicated in FIG. 4.

The above-described operation is carried out continuously in information processing unit 182 during the period where address counter 232 provides an address 216.

Address counter 232 provides a stop flag 234 when a maximum count value is counted. Stop flag 234 is provided to timing circuit unit 230. Timing circuit unit 230 responds to stop flag 234 and stops clock signal 212. The counting operation of address counter 232 also stops. More specifically, address counter 232 stops providing an address when a predetermined number of addresses are counted from the head address. The size of the data flow program and the constant data group in memory 206 corresponds to this predetermined address. Therefore, address 216 moves across the address space in memory 206 occupied by the data flow program and the constant data group specified by selection switch 174.

As described above, a desired program and a desired constant data group specified using selection switch 174 can be downloaded to information processing unit 182 in a format of download data 220 just by applying a reset signal 188 to data driven type information processor 170. This downloading operation can be carried out parallel to the program execution operation in information processor 182. More specifically, a data packet including a load information code is selected to be loaded to program storing unit 64 (refer to FIG. 1) by referring to the instruction information in data packet 100. It is possible to enter a desired arbitrary load packet of a program and constant data into information processing unit 182 together with an execution packet for executing a program in information processing unit 182. This allows comparison and evaluation of difference in the processed result due to difference in constant data in a data flow program in parallel to execution of a program.

In the above-described embodiment, only one data driven type information processor was used for downloading. However, the present invention is not limited to downloading programs and data only to one data driven type information processor, and can be applied to a system where downloading is carried out to a plurality of data driven type processors as shown in FIG. 10.

Figure 10:
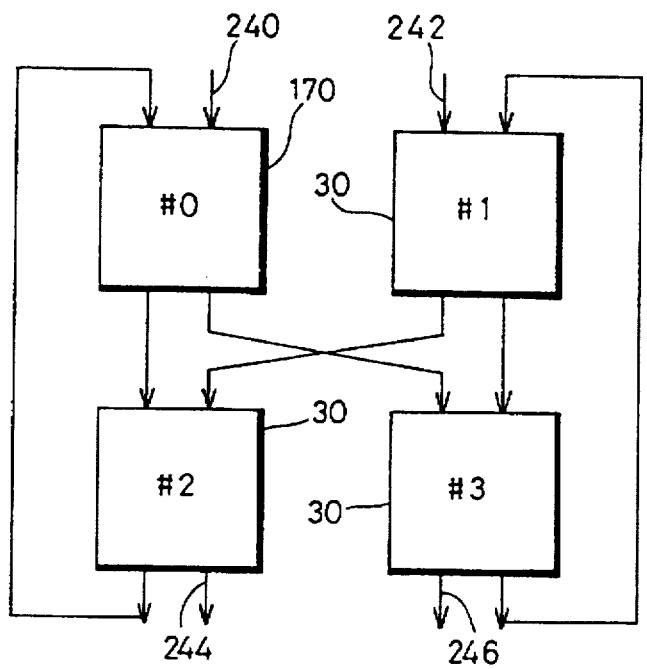
FIG. 10 shows a system configuration including a plurality of data driven type information processors which receive data downloaded by the download functionality of FIGS. 7-9.

FIG. 10 shows a multiprocessor system including four data driven type information processors (referred to as "processor" hereinafter) #0–#3 that are shuffle-coupled. The system includes two inputs 240 and 242 and two outputs 244 and 246. Only one processor connected to one of the two inputs of 240 and 242, for example processor #0, is provided with a download unit 180 shown in FIGS. 7–9. Download unit 180 of processor #0 can also download programs and data to all the other processors #1–#3.

More specifically, each processor stores a processor number identifying itself in a one-to-one correspondence. When each processor receives a data packet 100, the processor number (PE) 114 stored in the relevant packet 100 and a prestored processor number is compared. Each processor makes the determination whether that data packet 100 is addressed to itself by the comparison result. Each processor takes in a data packet 100 addressed to itself, and provides a data packet 100 to another processor that is not addressed to itself. The data packet 100 provided from the download unit to data driven type information processor 170 is distributed to respective processors by which they are to be processed. Therefore, programs and data can be downloaded from only one data driven type information processor 170 including the download unit into respective processors in the multiprocessor system of FIG. 10 at one time.

The download process described with reference to FIGS. 7–9 may be carried out parallel to the program execution of information processing unit 182. This means that there are a plurality of operand data sets mixed in information processing unit 182. Only one set is to be subjected to the current calculation and operation. It is necessary to distinguish the operand data that is to be processed currently by calculation and operation in information processing unit 182 from other operand data, and process the former with priority. Data packet 100 of FIG. 2 stores a generation number GN for identifying a plurality of operand data sets from one another and in a one-to-one correspondence. Firing control unit 66 detects firing while determining a data packet 100 that can be used giving priority to the matching memory according to the generation number of GN of data packet 100. The priority level of processing is ensured even when downloading and program execution are carried out in parallel with a mixture of a plurality of operand data sets.

In the above-described embodiment, the maximum count value of address counter 232 is fixed. When this maximum count value is counted, address counter 23 provides a stop flag 234. However, the present invention is not limited to this embodiment, and the maximum count value may be variable according to the type of the selected program or constant data group.

More specifically, when the type of a program or a constant data group is specified by selection switch 174, a program select specifying signal 184 or a constant data group select specifying signal 186 is applied to selection mode decode unit 202. Selection mode decode unit 202 responds to signal 184 or 186 to decode the readout start address and read out size (the size of the object data of the specified program or constant data group) in memory 206. The decoded data is set in preset/reset data 214 and provided to address counter 232. Address counter 232 responds to preset/reset data 214 to initiate counting from the specified readout start address. Address counter 232 continues the counting operation for the specified readout size to provide address 216 sequentially. Upon completion of a counting operation for the specified readout size, address counter 232 provides a stop flag 234. Timing control unit 230 stops clock signal 212. In response, address counter 232 stops counting. The readout start address and the size of data to be read out from memory 206 can be specified arbitrarily according to the type of the program or constant data group to be downloaded.

Although the downloading operation is initiated according to an input of a reset signal 188 in the present embodiment, any signal can be used that instructs initiation of downloading.

Second Embodiment

A second embodiment of the present invention will be described in detail with reference to the drawings.

Figure 11:
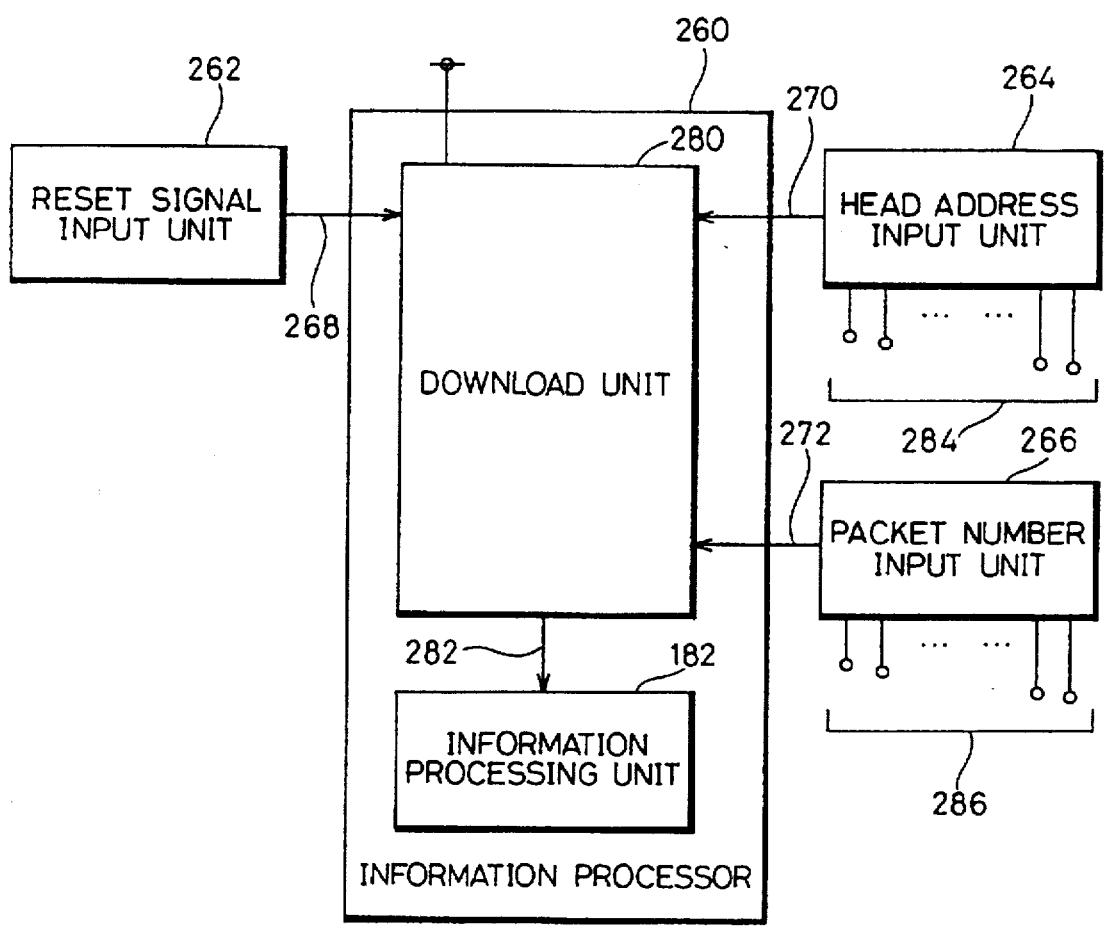
FIG. 11 is a block diagram of a data driven type information processor according to a second embodiment of the present invention.

Referring to FIG. 11, a data driven type information processor 260 according to the present invention includes an information processing unit 182 for carrying out data driven type information processing, and a download unit 280 for downloading object data as a data packet into information processing unit 182 object data as a data packet. Data driven type information processor 260 is connected to an external reset signal input unit 262, a head address input unit 264, and a packet number input unit 266. Information processing unit 182 has a structure and functionality similar to those of the conventional data driven type information processor of FIG. 1, and their details will not be repeated here.

Figure 12:
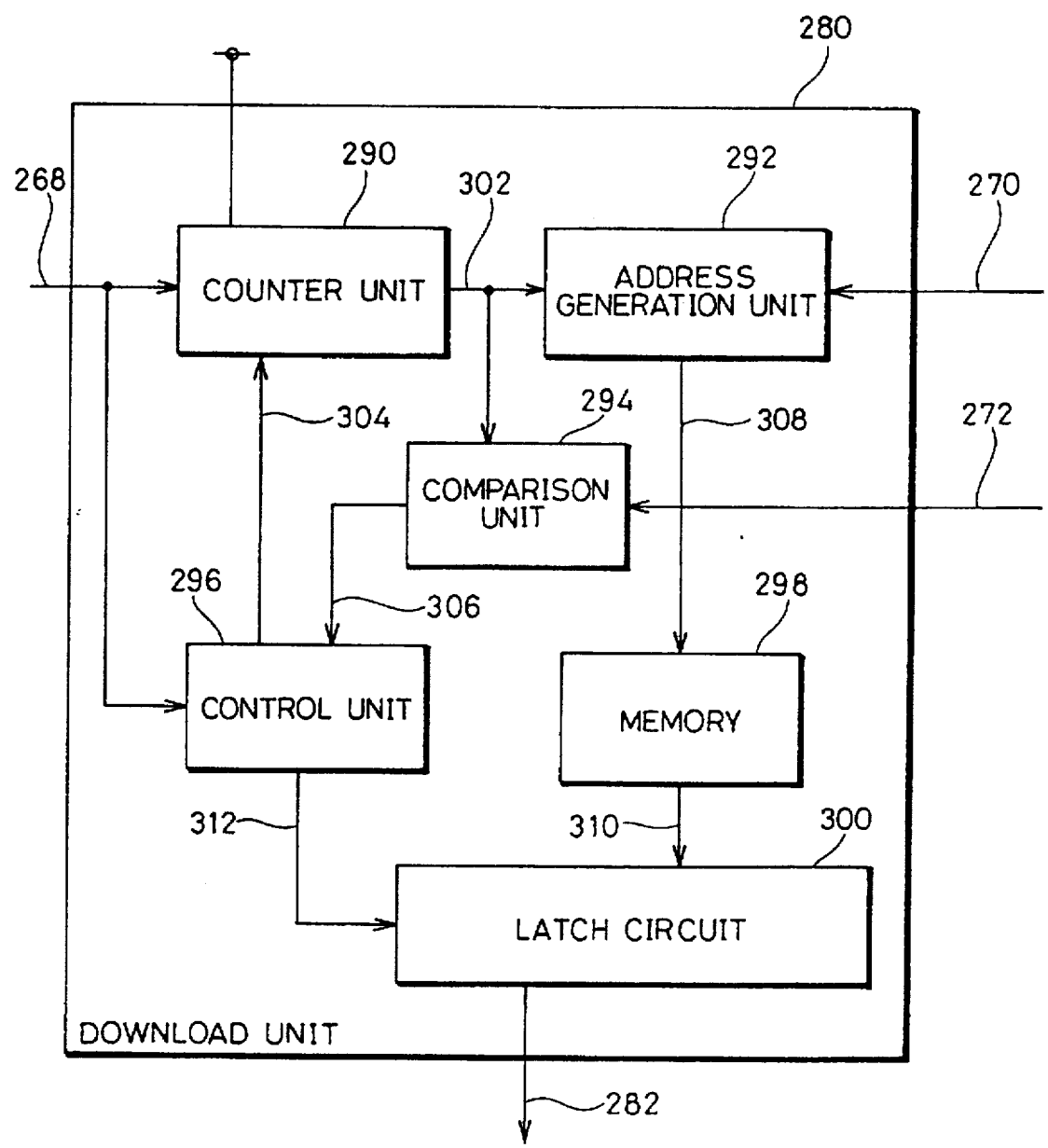
FIG. 12 is a block diagram of a download unit of the data driven type information processing according to the second embodiment of the present invention.

Referring to FIG. 12, download unit 280 includes a counter unit 290, an address generation unit 292, a comparator unit 294, a control unit 296, a memory 298 storing data to be downloaded as a data packet, and a latch circuit 300. Download unit 280 accesses memory 298 according to an externally applied data specifying an address of memory 298 and downloads readout data into information processing unit 182.

Reset signal input unit 262 includes a manually operable reset button (not shown). Reset signal input unit 262 responds to a manual operation of the reset button to output and provide to download unit 280 a reset signal 268. The reset button serves to reset (initialize) the hardware of download unit 280.

Head address input unit 264 includes, for example, eight terminals 284. Either ground potential or a predetermined potential is applied to each terminal. Head address input unit 264 supplies a head address signal (AS) 270 of 8 bits in width to address generation unit 292. Head address signal 270 is used to specify a readout start address for reading out data from memory 298. Although a terminal 284 for providing head address signal 270 is used in the present embodiment, it is possible to provide a mechanism that provides a head address signal 270 to data driven type information processor 260. For example, a mechanism may be implemented that changes head address signal 270 with software.

Suppose that the bit width of a signal line connecting head address input unit 264 and address generation unit 292 is limited, requiring reduction of the bit width. It is assumed that the width of head address signal 270 is reduced to 6 bits from 8 bits. In this case, the most significant 6 bits of the 8 bit address is used. Address generation unit 292 multiplies by four the data indicated by head address signal 270 and adds this value to the count value indicated by count value signal 302. As a result, an address signal 308 can be obtained similar to the case where head address signal 270 has a width of 8 bits. Here, only every fourth address for accessing memory 298 can be specified using head address signal 270. However, the above-described head address can cover almost all of the address space. When a signal line of 7 bits or 5 bits in width is used, the head address signal should be multiplied by two and eight, respectively.

Packet number input unit 266 includes, for example, eight terminals 286. Either ground potential or a predetermined potential is applied to each terminal. Packet number input unit 266 provides a packet number signal (PN) 272 of 8 bits in width to comparison unit 294. Packet number signal 272 is used to specify the number of data packets to be read out from the above-described readout start address in memory 298. Although the present embodiment is described using a terminal 286 for specifying a value of packet number signal 272, it is possible to provide a mechanism that supplies a packet number signal 272 to data driven type information processor 260. For example, a mechanism may be provided to change packet number signal 272 with hardware.

Referring to FIG. 12, counter unit 290 includes a count signal oscillator and a counter not shown. Counter unit 290 counts the number of pulses of a clock signal to generate a count value signal (CNT) 302 which is applied to address generation unit 292 and comparison unit 294. Counter unit 290 responds to reset signal 268 to initiate a counting operation, and responds to a stop flag signal 304 provided from control unit 296 to stop counting. Counter unit 290 suspends its operation until a reset signal 268 is input.

Address generation unit 292 serves to receive a count value signal 302 and a head address signal 270 to provide a specify address signal (ADR) 308 to memory 298. Specify address signal 308 is obtained by an summing process of, for example, a count value signal 302 and a head address signal 270. By using a specify address signal 308, an address space starting from the address specified by head address signal 270 can be specified in memory 298.

Comparison unit 294 serves to receive a count value signal 302 and a packet number signal 272 to compare the values thereof. A comparison result signal (CMP) 306 indicating the comparison result is provided to control unit 296. For example, if the count value indicated by count value signal 302 is smaller than the number of packets indicated by packet number signal 272, comparison unit 294 sets comparison result signal 306 to logic "1". If the count value is not smaller than the packet number, comparison unit 294 sets the level of comparison result signal 306 to "0". Comparison result signal 306 indicates whether the count value after input of a reset signal 268 in counter unit 290 reaches the number of packets specified at packet number input unit 266.

Control unit 296 responds to the changing level of comparison result signal 306 and serves to set and provide the level of a control signal (CTRL) 312 to latch circuit 306, and provides a stop flag signal 304 to counter unit 290. For example, if the level of comparison result signal 306 is logic "1", control unit 296 sets the level of control signal 312 to logic "1". If the level of the comparison result signal 306 is logic "1", the level of control signal 312 is set to logic "0". Control unit 296 is set to a state where input of a comparison result signal 306 is allowed in response to an input of reset signal 268 from reset signal input unit 262.

Memory 298 serves to store in advance as the aforementioned data packet object data and data of an execution format to be given to information processing unit 182 executing a data flow program, and sequentially provides the data packet stored in an address specified by specify address signal 308 as download data (DLD) 310 into latch circuit 300. Memory 298 includes a ROM (Read-Only Memory) or a ultraviolet-light erasable type programmable ROM.

Latch circuit 300 serves to receive download data 310 and to provide a download data 282 to information processing unit 182 according to control signal 312. More specifically, latch circuit 300 provides or not provide download data 282 sequentially to information processing unit 182 according to whether the logic level of control signal 312 is "1" or "0".

The data driven type information processor of the second embodiment operates as follows.

Referring to FIG. 11, a user operates input terminal 284 to set a desired value for head address signal 270 in advance. The user also operates terminal 286 to set packet number signal 272 to a desired value. Thus, a readout start address for reading out download data 310 from memory 298, and the number of packets to be read out starting from the set start address can be specified in advance to desired values.

Then, the user operates reset signal input unit 262 to provide a reset signal 268 to download unit 280.

Referring to FIG. 12, counter unit 290 responds to a reset signal 268 to initialize the internal counter to the value of −1. The clock signal oscillator within counter unit 290 responds to reset signal 268 to initiate output of a clock signal. The counter in counter unit 290 counts the number of pulses in the clock signal to provide a count value signal 302 to address generation unit 292 and to comparison unit 294. Control unit 296 also responds to reset signal 268 to be set to a state that can receive a comparison result signal 306.

Address generation unit 292 adds count value signal 302 and head address signal 270 to generate a specify address signal 308 which is provided to memory 298. Specify address signal 308 is updated following the incrementing operation of counter unit 290 to specify the next address in the address space starting from the address specified by head address signal 270 of memory 298.

Comparison unit 294 compares the value of count value signal 302 with that of packet number signal 272. If the former is smaller than the latter, comparison unit 294 sets the logic of comparison result signal 306 to "1", and otherwise, to "0". Therefore, comparison result signal 306 attains the level of logic "1" until a predetermined number of data packets are provided.

Memory 298 generates and provides to latch circuit 300 download data 310 according to the data packet stored in the address specified by specify address signal 308.

Latch circuit 300 receives download data 310 to provide the same to information processing unit 182 according to control signal 312. More specifically, latch circuit 300 provides download data 282 to information processing unit 182 as long as the logic level of control signal 312 is "1".

As described with reference to FIG. 7, information processing unit 182 can receive another program data and constant data from download unit 280 in the form of data packet 100 of object data even if during execution of a data flow program to store (load) the same into a region corresponding to program storing unit 64 or extended data storing unit 32 in FIG. 1. Furthermore, information processing unit 182 can also load an execution packet (a packet including an execution instruction in instruction field 116, not a load instruction).

Figure 4:
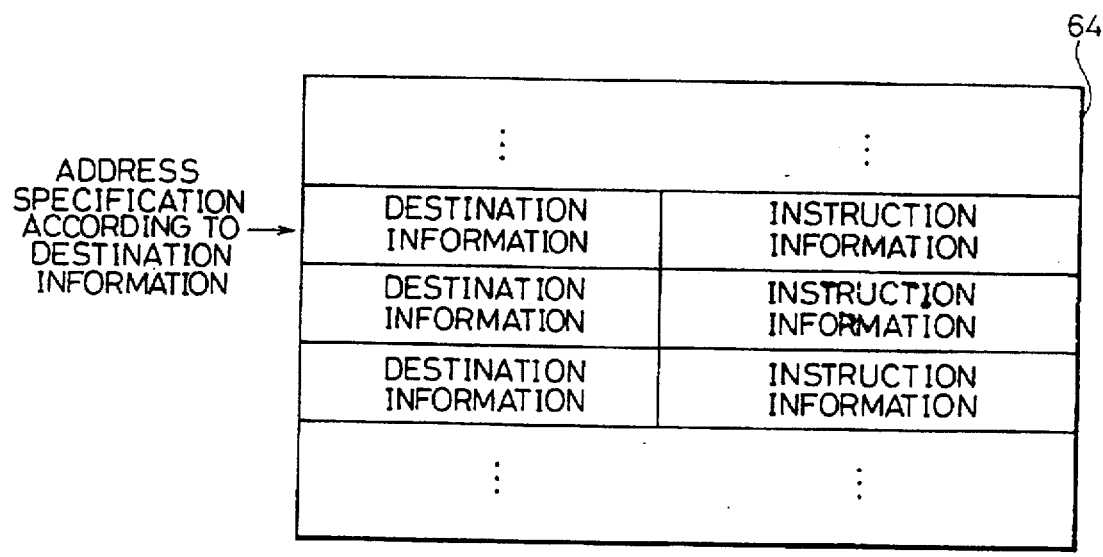
FIG. 4 partially shows a field configuration of stored contents in a program storing unit.

Information processing unit 182 receives download data 282 of a data packet format provided from download unit 280 via a terminal corresponding to input terminal IN FIG. 1. The downloaded data packet 100 is applied to program storing unit 64 via input/output control units 60 and 62. Program storing unit 64 decodes the instruction information of data packet 100. If it is a load instruction code for program storing unit 64, destination information and instruction information of data packet 100 are stored in a format as shown in FIG. 4. If a data flow program is being executed in information processing unit 182 at the time of storing input packet 100, data packet 100 is stored so that the program data currently being executed is not destroyed (not overwritten).

Figure 5:
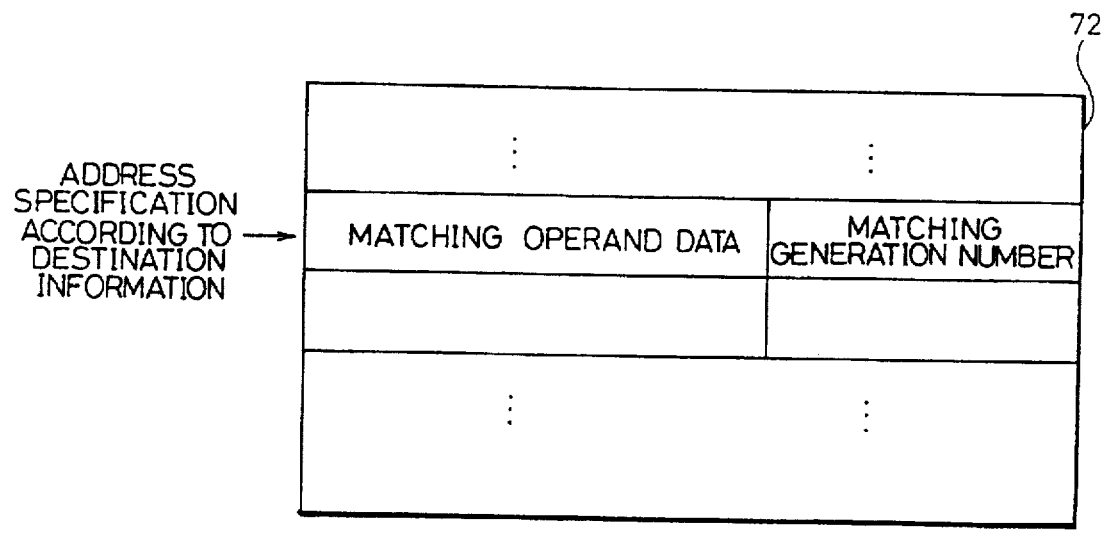
FIG. 5 partially shows a field configuration of stored contents in a matching memory of a firing control unit.
Figure 6:
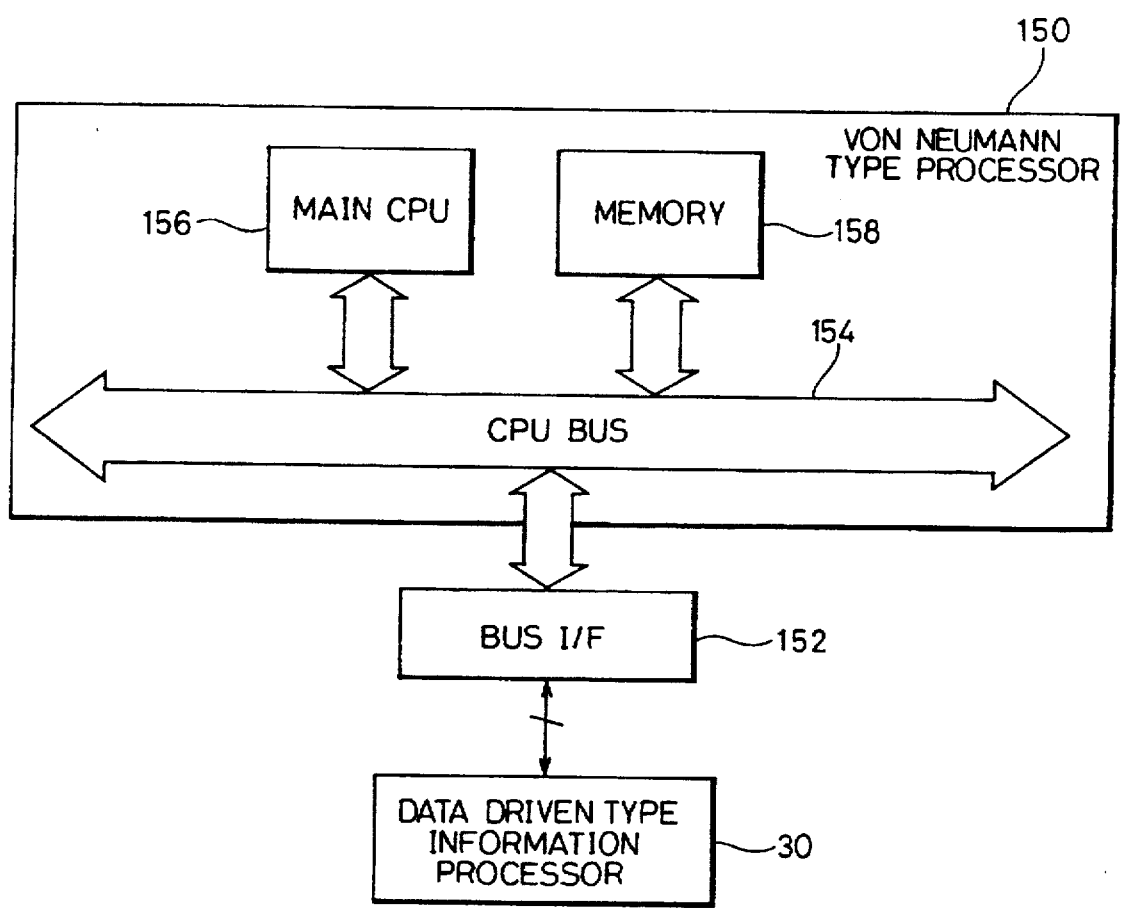
FIG. 6 shows an example of a system configuration for downloading program and data or uploading data with the data driven type information processor shown in FIG. 1.

If the instruction code stored in instruction field 116 of data packet 100 indicates an execution packet, program storing unit 64 provides the next program data as described with reference to FIG. 5 according to an address specification by the destination information of data packet 100. Therefore, when download data 282 loaded from download unit 280 is an execution packet, information processing unit 182 responds to the relevant execution packet and immediately executes a predetermined process. Such an execution packet can be utilized in an interrupt process or the like with respect to information processing unit 182.

When the incrementing operation of counter unit 290 proceeds and the value of count value signal 302 equals that of packet number signal 272, comparison unit 294 changes the logic of comparison result signal 306 to "0" from "1", and maintains logic "0" thereafter. In response, control unit 296 changes the level of logic signal 312 to "0". Latch circuit 300 suspends its output operation. Since control unit 296 provides a stop flag signal 304 to counter unit 290 parallel to a control signal, counter unit 290 also stops incrementing operation.

Therefore, the counting operation of counter unit 290 and the output operation of latch circuit 300 are disabled when the comparison result of signals 302 and 272 in comparison unit 294 indicates a match. Then, the current downloading operation ends. Counter unit 290 does not operate until a next reset signal 268 is input.

According to the above-described data driven type information processor of the second embodiment, the user only has to provide a head address signal 270 and a packet number signal 272 of a desired level to download unit 280 via head address input unit 264 and packet number input unit 266, respectively, and then enter a reset signal 268. Data packets stored in a desired address space in memory 298, in other words, a desired number of data packets, are downloaded automatically thereafter to information processing unit 182 in the form of download data 282.

Although the download operation is initiated in response to an input of reset signal 268 in the present embodiment, any signal that triggers initiation of a download operation can be used.

According to the above-described embodiment, download data is prestored as a data packet in a download data memory, and the readout head address and number of packets to be read out are set to desired values. By just applying a signal initiating downloading, only the data packets stored in a desired address space out of data packets stored in the download memory are automatically downloaded to information processor. Such a data driven type information processor incorporating download functionality can be used in a stand-alone manner.

By the above-described effect, a data driven type information processor can be obtained that does not require provision of a host computer or an interface for downloading. Therefore, reduction of the equipment in which a data driven type processor is incorporated can be facilitated in comparison with a conventional one. Furthermore, the cost of the equipment in which the data driven type information is incorporated can be reduced significantly.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stand-alone data driven type information processor comprising:

processing means, including program storing means and input and output means of a data packet, for storing into said program storing means information stored in an applied data packet having a predetermined instruction, and for carrying out data driven type processing on data packets including other predetermined instructions according to said information stored in said program storing means, and dedicated download means for downloading program data to said processing means by applying to said processing means a data packet including said predetermined instruction and program data to be stored in said program storing means, wherein said dedicated download means including:

download source memory means for storing said program data;

reading means for reading out a set of program data stored in said download source memory means and outputting read out program data; and packet generation means for autonomously generating, from externally received non-packetized information including raw data and tag information and independent of any external request signal, a data packet including said predetermined instruction, raw data and tag information, said data packet also being based in part upon said read out program data, and for providing the same into said input and output means of said processing means;

wherein said download source memory means stores a plurality of sets of said program data;

wherein said reading means includes:

specifier means, responsive to a program-selection operation by a user, for generating a program-select signal specifying one of a plurality of head addresses of programs in the memory means;

the data driven type information processor achieving stand-alone autonomous operation independent of an operative connection to an external device.

2. The stand-alone data driven type information processor according to claim 1, wherein said reading means comprises decoding means for decoding a head address of a program in said memory means based upon said program-select-signal, and (address generation means for generating, according to a predetermined method, an address signal for specifying each address in said address space using said head address as a starting point.

3. The stand-alone data driven type information processor according to claim 2, wherein said address signal generation means comprises:

means, responsive to an externally-applied signal triggering initiation of downloading, for generating a predetermined clock signal; and increment means responsive to said clock signal for incrementing said address signal and providing a stop flag signal upon detection of said address signal arriving at a predetermined value, wherein said means for generating said clock signal responds to said stop flag signal to suspend generation of said clock signal.

4. The stand-alone data driven type information processor according to claim 3, wherein said increment means comprises means, responsive to each pulse of said clock signal, for adding one to said address signal.

5. The stand-alone data driven type information processor according to claim 1, wherein:

said program-select signal is an N-bit representation of a head address, where N is an integer and $N \geq 5$;

said specifier means also generates a block-size signal specifying a number of program data packets to be read out from said memory means; and said reading means includes:

address generation means for generating, according to a predetermined method and responsive to said block size signal, an address signal specifying each address in said address space with said reference address as the starting point.

6. The stand-alone data driven type information processor according to claim 5, wherein said address generation means comprises means, responsive to an externally applied signal for triggering initiation of download, for generating a counter signal incrementing the value thereof at a predetermined rate, means for add said counter signal and said head address for generating said address signal, comparison means for comparing the value of said counter signal and said block size signal and for providing a detection signal upon detection of the value of said counter signal exceeding said block size signal, and means, responsive to said detection signal, for suspending the operation of said means for generating said counter signal and said means for generating said data packet.

7. A stand-alone data driven computer apparatus comprising:

at least one data driven processor unit including:

temporary memory for temporarily storing at least one of a portion a data flow program and a portion of a group of constants; and a dedicated download unit, operatively interconnected to the at least one data driven processor unit, the download unit including:

download source memory operable to store a plurality of data flow programs;

specifier means, responsive to a program selection operation by a user, for generating a program-select signal specifying one of a plurality of head addresses of programs in said download source memory; and data packet generation means for autonomously generating, from externally received non-packetized information including raw data and tag information and independent of any external request signal, a data packet having raw data and tag information based in part by reading out of the download source memory;

the download unit generating at least one data packet for downloading to the data driven processor unit, the data driven processor unit storing the data packet in the temporary memory;

downloading being carried out regardless of whether the data driven processor unit is concurrently executing a program;

the data driven computer apparatus achieving stand-alone autonomous operation independent of an operative connection to an external device.

8. An apparatus as in claim 7, wherein:

said download source memory also is operable to store a plurality of groups of constant data;

the program-select signal is a code identifying a program such that the head address thereof is indirectly identified; and said specifier means also generates a block-size signal specifying a number of data packets to be read from said download source memory.

9. An apparatus as in claim 7, wherein said specifier means includes:

a head address circuit operable to generate an N-bit representation of a head address provided by said specifier means as the program-select signal, where N is an integer and $N \geq 5$; and a block size circuit operable to generate a packet number signal specifying a total number of addresses to be read out of the download source memory.

* * * * *